Aug. 2, 1960  R. CHAPMAN  2,947,654
METHOD OF MANUFACTURING A COMPOSITE BOARD PRODUCT
Filed March 26, 1956  3 Sheets-Sheet 1
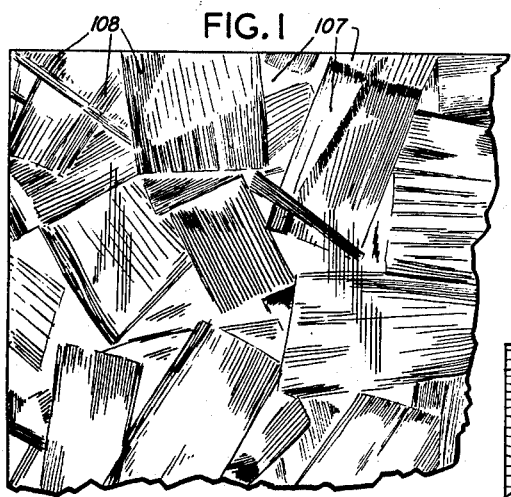
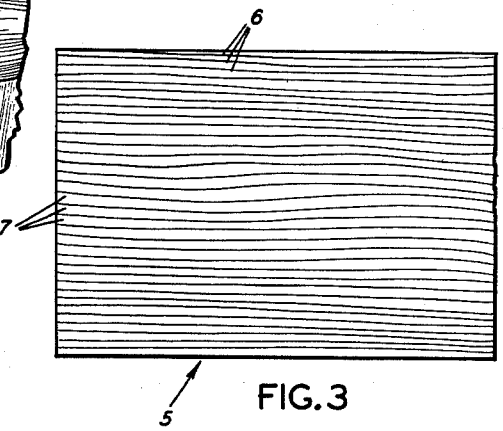
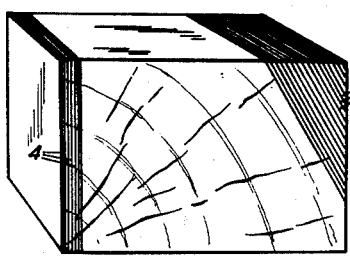
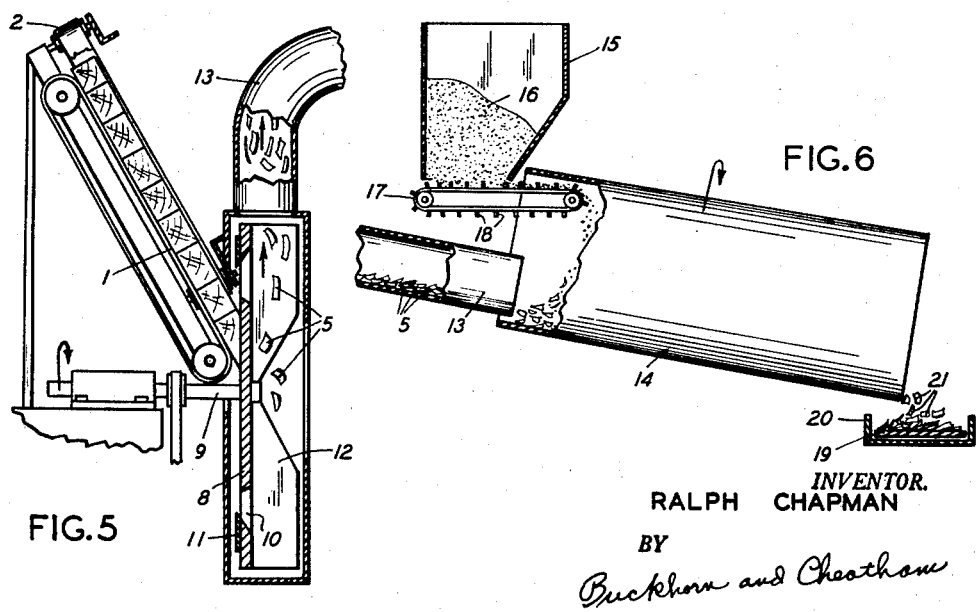
INVENTOR.
RALPH CHAPMAN
BY
Buckhorn and Cheatham
ATTORNEYS

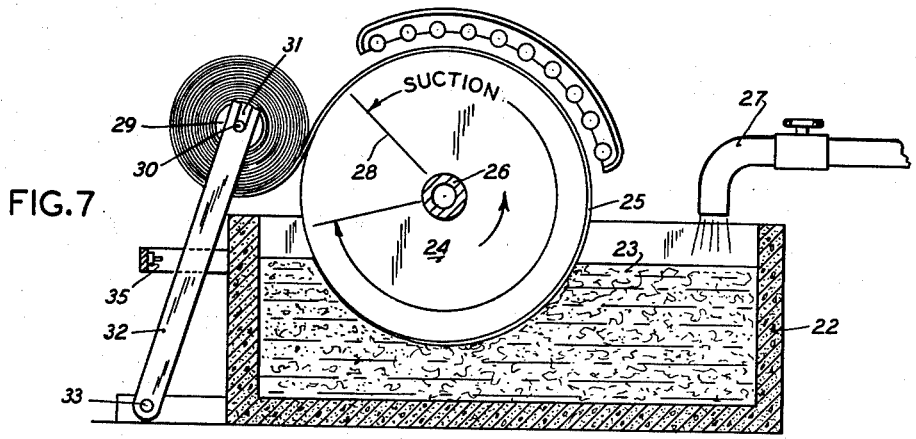
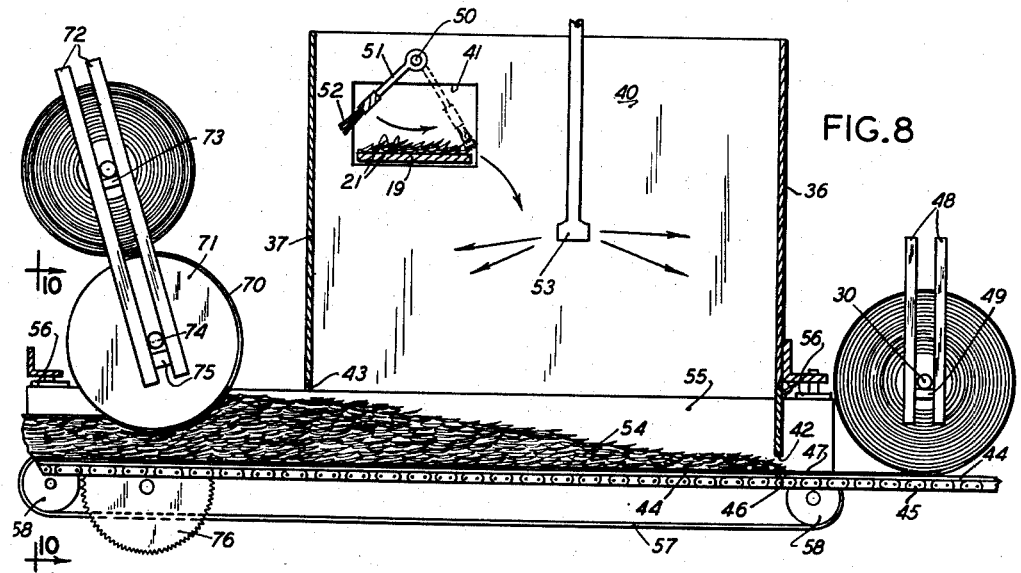
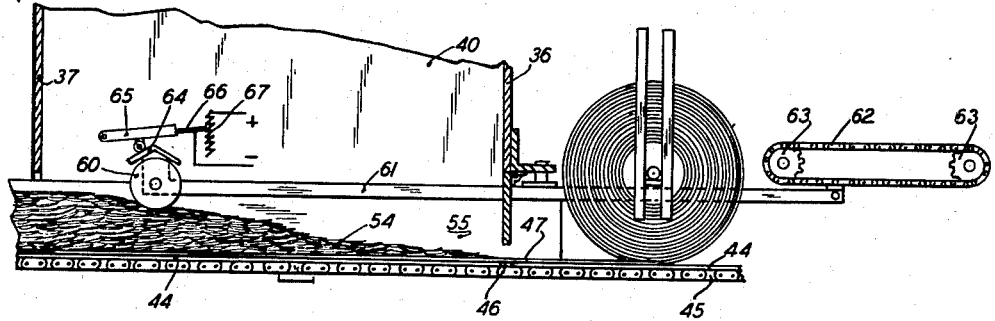

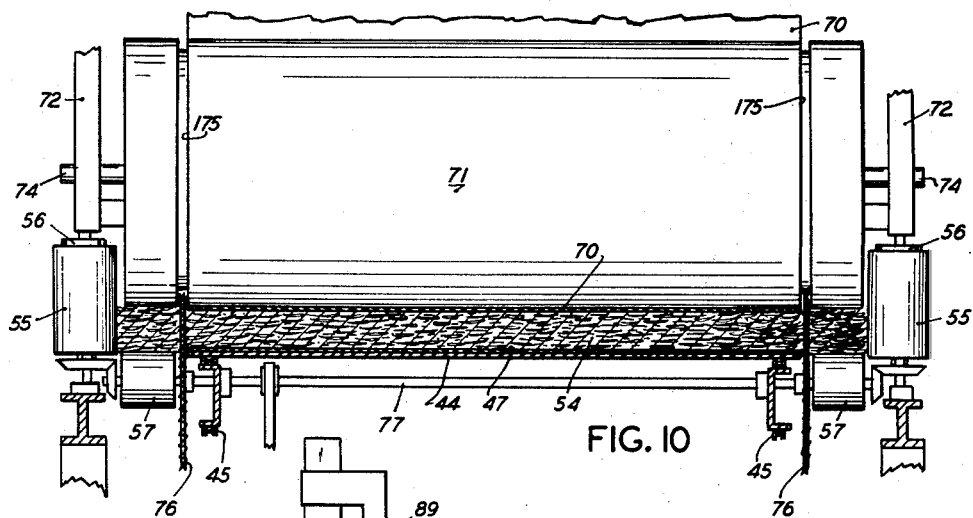
Aug. 2, 1960  R. CHAPMAN  2,947,654
METHOD OF MANUFACTURING A COMPOSITE BOARD PRODUCT
Filed March 26, 1956  3 Sheets-Sheet 3
INVENTOR.
RALPH CHAPMAN
BY
Buckhorn and Cheatham
ATTORNEYS

United States Patent Office 2,947,654
Patented Aug. 2, 1960

2,947,654

METHOD OF MANUFACTURING A COMPOSITE BOARD PRODUCT

Ralph Chapman, Corvallis, Oreg., assignor to Wood Processes (Oregon) Ltd., Corvallis, Oreg., a limited partnership Filed Mar. 26, 1956, Ser. No. 573,897

5 Claims. (Cl. 154—100)

This application comprises a continuation-in-part of my copending application, Serial No. 487,753, filed February 14, 1955.

My present invention relates to composite board products and the method of manufacturing the same, the products being distinguishable from prior art products by having edge surfaces of fine texture, by having hard, tough surface skins of irregular density composed of consolidated, cellulosic fibers, by the fact that the product is relieved of internal stresses and hence has less tendency to warp than products made by prior methods, and by other superior characteristics.

A principal purpose of the present invention is to provide a panel or board having durable surface skins that may be painted, stained or otherwise decorated, or left in their natural state, whereby the product may be used for a wide variety of interior or exterior uses.

A further object of the present invention is to provide a composite board product which may be made from scrap lumber and yet will have integral surface skins of good quality which are receptive of decorative material and adhesives whereby the board substitute may be used as a surfacing material or as the core stock for veneered furniture or the like. This object enables utilization of ordinarily wasted pieces of wood, such as mill scraps, slab wood, and the like, most of which are now burned at great economic loss.

A further object of the present invention is to provide a medium density board product, having a density in the order of 0.5 to 0.75, preferably about 0.6, which is structurally rigid for the purposes for which such boards are intended, such as wall paneling, sheathing, furniture core stock and the like, and which will have smooth surfaces of good texture and of decorative appearance.

A further object of my invention is to provide a substitute for plywood of any reasonable thickness, which may be economically made from scrap material and which will have strength, rigidity, workability, and other qualities in many respects better than plywood. For example, a medium density board made from fir lumber in accordance with my invention has about the same weight as fir plywood of the same thickness, is less susceptible to swelling and warping, possesses comparable insulating value and has greater strength in some respects. For example, a board made in accordance with my invention to have a specific gravity of 0.6 has a modulus of rupture in any direction of about 5,000 p.s.i., whereas the best grade of fir plywood may have a modulus of rupture in the weak direction of around 3,000 to 4,000 p.s.i., and a modulus of rupture in the strong direction of approximately 6,000 to 7,000 p.s.i. It is to be appreciated that the strength of board made in accordance with my invention may be materially increased by increasing the amount or type of adhesive used, the above figures being for a board embodying a core of wood veneer flakes and approximately ten percent by dry weight of soya-bean flour as the adhesive. Lesser strength results from using planer shavings, or the like, in the core, but any board manufactured in accordance with my invention has crushing strength comparable to either plywood or lumber, is of homogeneous texture throughout, devoid of weak spots, knot holes or voids throughout, may be machined on its edges to good smoothness, and has nail, screw or veneer holding ability equal to plywood and most natural woods. It may be intricately machined with little crumbling, if any.

A further advantage of the present invention is that boards or large panels may be made in a small plant utilizing automatic machinery requiring a minimum amount of labor and which may be located in any place where scrap lumber and waste wood are available, as distinguished from plywood which must be made in large mills suitably located with respect to sources of "peeler" logs.

A major advantage of the product of my invention is that there is no need for patching, grading, or other expensive manual operations in the fabrication thereof.

A further object of the present invention is to provide a method of manufacturing such board products in which the fibrous materials thereof are bound together by the use of adhesives, which is distinguished over prior art methods in that there is no necessity for applying a parting compound or lubricant to the surfaces of the caul plates or platens employed in the consolidation thereof. This object is achieved by limiting the adhesive to the interior of the product by applying the adhesive to "veneer flakes" which form the core of the product, and sandwiching a thick layer of interleaved, adhesive-coated veneer flakes between wet blankets of cellulosic fiber having no added adhesive therein whereby no adhesive contacts the platens or caul plates used in the consolidation process.

A further object of the invention is to provide a tempered board product of the character described above, and process of forming the same, which product has the surface characteristics of tempered hardboard.

The foregoing and other objects and advantages of the present invention will be more readily understood by reference to the accompanying drawings, taken in connection with the following specification, wherein like numerals refer to like parts throughout and in which a preferred form of the product, and a schematic representation of the apparatus for carrying out the process, are illustrated and described.

In the drawings,

Fig. 1 is a plan view of a portion of a composite board product made in accordance with my invention;

Fig. 2 is a side view of a portion of the product, showing the edge structure thereof;

Fig. 3 is a plan view of a typical veneer flake embodied in one form of the board;

Fig. 4 is a perspective view of a wood block from which the veneer flakes are formed, showing two manners of slicing of the block to form the veneer flakes;

Fig. 5 is a vertical section through a schematic representation of one form of machine in which wood blocks may be diagonally sliced into veneer flakes;

Fig. 6 is a side elevation with parts broken away on a vertical central plane of a schematic representation of one form of equipment for applying adhesive to veener flakes or other wood particles;

Fig. 7 is a vertical section through a schematic representation of a form of cylinder machine for forming wet blankets of cellulosic fiber utilized to provide the surface skins of the composite board;

Fig. 8 is a vertical section through a schematic representation of a form of equipment for forming a sandwich of veneer flakes or other wood particles between wet blankets of cellulosic fiber;

Fig. 9 is a vertical section partially corresponding to Fig. 8 and schematically setting forth a form of equipment which may be added to the forming machine of Fig. 8 in order to insure uniformity of the final product;

Fig. 10 is a vertical cross-section on an enlarged scale taken substantially along line 10—10 of Fig. 8;

Fig. 11 is a vertical section through a schematic representation of a form of flying saw utilized for separating sections of the material formed in the equipment of Figs. 8, 9 and 10 into proper lengths; and Fig. 12 is an end view, with parts partially in vertical section, of a schematic representation of a portion of a hot press illustrating a sandwich of material formed in the equipment of Figs. 9 to 11, inclusive, in the process of being consolidated between heated platens.

In accordance with my preferred process veneer flakes are sliced from waste wood, such as mill ends of lumber, scraps from furniture factories, slab wood, or logs. While it is possible to utilize various sizes and types of material to form veneer flakes of various sizes it is more economical to utilize only one size and type from which to cut or slice the veneer flakes. It is preferable to use blocks approximately two inches thick, three inches long with the grain, and of any width, the blocks being cut for this purpose from mill ends of lumber by means of gang saws. These blocks are best formed from lumber which has been soaked or steamed, or are still in a green condition, so as normally to contain about thirty to fifty percent water by weight. The blocks are placed in a container through which exhaust steam is passed for a sufficient period of time to cause the moisture thoroughly to penetrate the blocks, a process which can be uniformly controlled by having uniformly sized blocks. A typical block is shown in Fig. 4.

A plurality of these blocks are oriented and fed successively into a machine for slicing them into veneer flakes, such as schematically illustrated in Fig. 5, the blocks being so oriented with respect to the slicing equipment that the grain of the wood runs longitudinally of the formed veneer flakes as illustrated in Fig. 3. A suitable machine for this purpose comprises a feeding mechanism including a driven, endless belt 1 forming the bottom of a trough, and a pair of such driven, endless belts forming the sides of the trough, such as the one indicated by the numeral 2. The angle of inclination of the trough may vary from nothing to sixty degrees. It will be seen that slicing the block on the diagonal, along the lines 3 in Fig. 4, results in the formation of a number of narrow veneer flakes of variable width, which may be termed "fines," and a larger number of veneer flakes of uniform width, the veneer flakes being uniformly the length of the block, uniformly thick, and ranging in width up to three or four inches, there being a maximum of wider veneer flakes. I have determined that veneer flakes ranging in thickness from 0.010 to 0.030 inch in thickness may be used, with the optimum thickness being approximately twenty-thousandths of an inch, such veneer flakes being thin enough to permit uniform softening of the fibers and the binding material of the wood and slippage of the fibers with respect to each other during the compacting of the product, and being thick enough to have desired strength. While it may be desirable to employ diagonal slicing so as to form a certain percentage of narrow veneer flakes, it is not necessary, and veneer flakes may be formed by vertical slicing along the lines 4 indicated in Fig. 4. Each veneer flake 5, however formed, will have the grain of the wood extending longitudinally as indicated by the alternate growth rings 6 and softwood 7 in Fig. 3, so as to be straight-grained.

The driven belts 1 and 2 of the veneer flake slicing machine frictionally force the blocks against the face of a cutter disc 8 which is mounted upon a shaft 9 extending to one side and connected to any suitable source of power through a speed controlling means (not shown) whereby the number of veneer flakes produced per increment of time may be controlled. The disc is provided with several openings 10, adjacent each of which are provided veneer flake slicing knives 11 which slice the blocks into the veneer flakes 5. The thickness of the veneer flakes is uniformly controlled by variably setting the projection of the knife edges with respect to the face of the cutter disc against which the blocks rest between engagement by the knives. The veneer flakes so formed are propelled by fan blades 12 fixed to the disc 8 into an exhaust tube 13 by means of which the veneer flakes are conducted to an adhesive applying mechanism schematically illustrated in Fig. 6.

The tube 13 conducts the moist veneer flakes into the upper end of a tumbling cylinder 14 which is inclined downwardly away from the tube and is provided with any suitable interior construction whereby the flakes are alternately lifted and permitted to fall through the interior of the cylinder while traversing its length. Adjacent the upper end of the cylinder is an adhesive supply bin 15 in which there is a supply of a dry, powdered adhesive as indicated at 16. At the bottom of the bin 15 there is provided an adhesive metering device schematically indicated as an endless belt conveyor 17 having spaced lugs 18 thereon, each of which pushes a certain amount of adhesive out of the bin and discharges it into the upper end of the tumbling cylinder, the rate of discharge being controlled by variable speed drive means (not shown) connected to the driving roll for the conveyor 17.

While any suitable form of adhesive could be utilized, it is preferred, for reasons of economy, ease of handling, storage life, and quality of finished product, that a powdered portein adhesive be used. While numerous such adhesives exist, such as casein glue and the like, it is preferred that a soya-bean adhesive, preferably raw soya-bean flour, be utilized. From about five to about fifteen percent by weight of dry adhesive to the weight of dry wood is introduced, about ten percent being economical and giving desired strength and other qualities. The tumbling of the moist veneer flakes together with the dry, powdered adhesive causes the veneer flakes to be uniformly coated throughout their surfaces with the adhesive. The coated veneer flakes drop from the lower end of the tumbling cylinder onto a conveyor belt 19 in a trough 20, which conveyor belt conveys the veneer flakes to the forming equipment. At this point the veneer flakes are "adhesive coated veneer flakes" indicated by the numeral 21.

The composite board product comprises the result of consolidating a sandwich of the adhesive coated veneer flakes between wet blankets of interlaced cellulosic fibers. The wet blankets may be suitably formed in several manners, a preferred manner being schematically indicated in Fig. 7, the equipment therein illustrated being a form of cylinder machine for forming webs of fibrous materials. This machine comprises a tank 22 in which a slurry of fibers in water suspension is placed as indicated at 23. The fibers employed may be formed from any suitable raw material of cellulosic nature, such as wood, straw, ramie and others utilized to make paper or pulp products. For reasons of economy the fibers are preferably provided by reclaiming ledger or bond paper, newspapers or magazines, or mixtures of the same, and preferably the ink is removed from the reclaimed material. In some cases the ink may remain with the fibers and various pigments may be added, or pigments may be added to de-inked slurries, or the fibers may be utilized in their natural color depending upon the result desired. The slurry is of the proper consistency for suction formation, such as about three quarters of one percent fibers by weight to the weight of water employed. A driven suction cylinder 24 rotates about a horizontal axis, with the lower portion of its periphery dipping into the slurry in the tank 22. The speed of rotation of the cylinder, or the suction force, or the consistency of the slurry, may be varied to determine the thickness of a continuously formed blanket 25 of cellulosic fibers formed on the surface of the cylinder by the application of suction through the screen or "wire" surface thereof, the water so withdrawn being discharged through the hollow hub 26 of the cylinder as is well-known in such devices. The slurry is replenished in proportion to the withdrawal of fibers therefrom through a supply pipe 27. Suction is maintained to reduce free water and to hold the formed blanket of fibers on the surface of the cylinder to the point indicated at 28, then the suction is relieved and the blanket 25 is withdrawn from the surface of the drum by rolling it onto a mandrel 29 having trunnions 30 at its ends which rest in slots 31 at the upper end of arms 32 pivoted near the bottom of the tank on pivots 33. The arrangement is such that the mandrel placed in the slots 31 rests against the surface of the cylinder, then the leading edge of a blanket is started around the mandrel by well-known means available for this purpose, or manually. As soon as the blanket is wrapped around the mandrel at least once it will continue to spirally wind itself onto the mandrel to the desired extent, whereupon the roll of blanket is cut loose from the cylinder. Preferably this occurs when the size of the roll of blanket on the mandrel has increased to such an extent that one of the arms 32 engages a switch 35 which stops the suction machine and actuates a bell or other alarm. The operator is thus made aware that the machine has formed a roll of the desired size, and the machine and supply of pulp thereto are automatically stopped by control means (not shown) until the finished roll is removed and a new mandrel brought into position. The finished rolls of blanket material are utilized in the sandwich forming machine to be described in connection with Fig. 8.

In Fig. 8 it is seen that the conveyor 19 brings the coated veneer flakes 21 into a forming bin having a front wall 36, a rear wall 37 and side walls 40, the side walls being provided with openings 41 through which the conveyor belt 19 passes. A stretch of conveyor belt between the side walls is horizontal and no guards are provided to hold the veneer flakes on the belt. The front wall 36 is provided with a narrow, horizontal slot 42 adjacent its lower edge and the rear wall 37 is provided with a wide, horizontal slot 43 adjacent its lower edge. A movable succession of caul plates 44, slightly spaced from each other, forms a horizontal bottom wall of the forming bin. These caul plates may be of any suitable metal of sufficient rigidity to maintain plane surfaces, being preferably formed of an aluminum alloy and being about one-quarter inch in thickness. They are fed endwise along the bottom of the bin by chain conveyors 45 having lugs 46 thereon which engage the rear edges of the caul plates and space them about one-half inch apart. The caul plates are preferably about two inches wider and two inches longer than the desired finished board. Also, while the forming bin has a length substantially less than that of one caul plate, it is about eight inches wider than the caul plates, for a purpose to be explained. The width of the blanket 25 is the same as the width of the caul plates, in other words approximately two inches wider than the finished product.

A first roll of wet blanket indicated at 47 is positioned on the caul plates 44 in advance of the wall 36. To achieve this the trunnions 30 of a mandrel on which a roll is formed are retained between upright bars 48 and rested on crossbars 49, whereby the roll may be held in position above the caul plates. The mandrel 29 comprises antifriction bearings (not shown) whereby when the leading edge of the wet blanket is laid upon a caul plate the friction of the blanket on the caul plate causes the blanket to be unrolled from the mandrel. Suitable braking means (not shown) are employed to prevent the roll from overrunning.

Mounted above the stretch of the conveyor belt 19 within the forming bin there is a horizontal, driven shaft 50 provided with radial arms 51 which support a broom 52 extending from side to side of the bin. The rate of revolution of shaft 50 is such that the broom sweeps the coated veneer flakes from the conveyor belt just at the moment when the leading veneer flakes reach the far side wall, without allowing any veneer flakes to pass through the bin. The veneer flakes fall freely through the space within the box, fluttering as they fall since they are quite light. Gentle air streams are blown through ducts 53 toward the end walls 36 and 37 for a purpose to be explained.

The layer of veneer flakes is built up to a depth of several inches, the exact depth depending upon the thickness desired for the finished product. The air blowing toward the end walls 36 and 37 causes the narrower veneer flakes to be blown toward the ends of the bin. Thus, the narrower veneer flakes which are blown toward the entering end wall 36 are laid down as a layer of "fines" on the surface of the lower wet blanket 47 as it enters the bin. The speed of the conveyor chains 45 is such that an interleaved mass 54 of coated veneer flakes is built up to the desired thickness in the form of a wedge of material with its maximum height near the exit end wall 37, and the air streams directed toward the end wall 37 cause more "fines" to be deposited as the upper layer of the mass 54 as it leaves the forming bin. It is to be appreciated that this result will come about regardless of whether the veneer flakes are sliced on the diagonal of the blocks or vertically with respect to the blocks. More such "fines" will be created if diagonal slicing is employed. However, a certain amount will be formed if vertical slicing is employed since the veneer flakes are so thin that a number of them are split into variable widths as the veneer flakes travel through duct 13 and the adhesive tumbling machine.

A pair of endless side belts 55 mounted upon vertical rollers 56 are positioned at the sides of the bin with their adjacent flights passing through slots in the end walls and extending inside of the walls 40, these belts being driven in unison with the caul plate conveyor so that the sides of the mass of veneer flakes are progressed forwardly without being disturbed. The side portions of the mass extending beyond the caul plates are supported upon a pair of endless belts 57 passing about rollers 58, these belts also moving in unison with conveyor 45.

In order that the mass 54 of interleaved veneer flakes 21 may be built up to exactly the desired thickness on the lower wet blanket 47 without the formation of voids, a smoothing roller 60 is employed. The roller is mounted between a pair of long arms 61 which are reciprocated through slots in wall 36 by a laterally spaced pair of endless chains 62 passing around sprockets 63. By this arrangement the roll 60 is driven forwardly up the wedge-shaped mass 54 at a uniform speed, momentarily arrested at its forward limit of travel and then returned at the same uniform rate of speed to a position near the entering end of the forming bin. The roll knocks down any veneer flakes which may be propped up on edge by other veneer flakes so that all are flatwise upon the wet blanket and upon each other, and also causes the veneer flakes to slide and shift into uniform compactness. A ramp 64 mounted above roll 60 lifts a conveyor speed control arm 65 at the end of the forward movement of the roll. A circuit (not shown) including a contact 66 on arm 65 and a rheostat 67, or other equivalent means, is employed to control a speed changer (not shown) in the driving mechanism for the caul plate advancing conveyor 45 and the belts 55 and 57. The relative speed of the caul plate conveyor 45 and of the roll driving chains 62 is such that the roll 60 is reciprocated within the forming bin a relatively large number of times during the progression of any increment of the caul plate may require three minutes to travel through the forming bin, and during the same length of time the roll 60 may be reciprocated approximately thirty times. If during one of these reciprocations the contact 66 reaches too high a position, it would mean that a too thick deposit was being formed and the speed of the conveyor would be slightly increased, and vice versa.

As the lower wet blanket 47 of cellulosic fiber and interleaved mass 54 of the coated veneer flakes emerge from the forming bin, an upper wet blanket 70 of cellulosic material is positioned thereon by the following means. A second roll of blanket material is positioned above a driven pressure roll 71 which rests upon the material. The trunnions 30 of the roll of material are guided between bars 72 and rest on crossbars 73. The pressure roll 71 is provided with trunnions 74 which are likewise guided by the bars 72, but the roll is free to rise and fall, being held from falling too far by stops 75. The pressure roll weighs about six hundred pounds so that the pack of material is greatly compressed. The wet blanket passes around the pressure roll and is laid thereby upon the upper surface of the interleaved veneer flake mass 54. The weight of the roll 71 is such that a mass of interleaved veneer flakes four inches deep is compressed to about two inches in thickness, but springs back to about three inches in thickness as it leaves the roll. The roll 71 is driven by suitable means (not shown) at the same peripheral speed as the speed of the conveyor 45.

The pressure roll 71 is provided with two peripheral grooves 175, the inner edges of which are adjacent the edges of the platen 44. A pair of circular saws 76 mounted on a driven arbor 77 beneath the platen 44 extend into the grooves 175, the saws trimming the excess from the sides of the mass. The sides of the mass are less likely to be compactly interleaved since the veneer flakes strike the side walls of the forming bin during their fall and are deflected inwardly to some extent. The side belts 57 terminate just beyond the saws whereby the trimmings may drop into salvage means (not shown) and be conducted back to the belt 19 for reintroduction into the forming bin.

The material on the caul plates leaves the forming bin in the form of an endless ribbon and must be cut into sections of appropriate length. For this purpose the caul plates and material are engaged by flying saw means including a longitudinally movable frame 80 which extends transversely of the forming machine and is guided by pairs of flanged wheels 81 engaging upper and lower tracks 82 at the sides of the machine. The frame 80 is moved forwardly at the same speed as the caul plates by an endless chain 83 driven in unison with chains 45. The chain 83 is driven by a sprocket 84 mounted on the shaft 85 which carries the end sprockets about which chains 45 pass, and chain 83 is spaced laterally from the side of the traveling mass on the caul plates. Chain 83 is equal in length to a single caul plate 44 and carries a lug 86 which passes above shaft 85 as each lug 46 on chains 45 passes above shaft 85. A finger 87 on frame 80 is engaged by the lug 86 and the frame is thereby moved forward.

The frame 80 includes a bracket 89 which supports an air cylinder device 88 controlling a rack 90. The rack engages one of a pair of pinions 91 at one end of a crossshaft 92 mounted on the frame, the other of the pair engaging another vertical rack at the other end of the frame (not shown). The racks 90 support a horizontal, slotted clamp 93 which is lowered onto the material with the slot therein overlying the space between adjacent caul plates, which space has been now vacated by the lug 46 on chain 45. Suitable control means (not shown) actuated by the finger 87 when engaged by the lug 86 actuates the cylinder 88, such means including means to raise the clamp before the carriage reaches the forward limit of its travel. A pressure of several pounds per square inch is exerted by the clamp, sufficient to hold the material in place while being sawn transversely.

The frame 80 includes a pair of transverse rods 94, and a carriage 95 is guided for transverse movement by these rods. The carriage supports a motor 96 which drives a saw 97 through a conventional belt drive. The saw normally rests at one side of the machine out of the path of the moving material, but suitable controls actuate an air cylinder 98 mounted on the frame 80 and connected to a multiplying chain drive (not shown) to pull the saw across the material and return it while the clamp is engaged. When the saw has been returned the clamp is raised, and the finger 87 is disengaged by the lug 86 which passes around the sprocket 99 and returns to the point of beginning. An air cylinder device 100 is then actuated to return the frame 80 to its original position. Driven carrier rolls 101 feed the released caul plate ahead at a rapid rate so that it, and the material supported thereon, may be inserted in the hot press without interference from the next caul plate to be released. The carrier rolls are constantly driven but slip with respect to the caul plate until clamp 93 is released. The trailing end of one caul plate and the leading end of the next caul plate are supported against the thrust of clamp 93 by several longitudinally extending bars (not shown) between the chains 45 and the first roll 101, the bars being suitably recessed so as not to engage the teeth of saw 97 when it passes over them.

It will be seen from the foregoing that the finished mass is longer and broader than the desired finished product by about two inches in each direction. For example, when making a forty-eight inch by ninety-six inch finished board the pack is laid down in an endless ribbon about fifty-eight inches wide, the saws 76 trim the ribbon to the width of the caul plate, or fifty inches, and the saw 97 cuts the ribbon into sections ninety-eight inches long. This leaves a one inch margin on all sides which is to be trimmed off after the board is consolidated.

The sandwich of upper and lower wet blankets of cellulosic fibers and the compressed mass of interleaved veneer flakes therebetween is consolidated in a hot press, a portion of which is schematically illustrated in Fig. 12. This hot press comprises a plurality of identical, hollow platens of which an upper one 102 and a lower one 103 are illustrated. The lower side edges of each platen are provided with downwardly extending jibs 104 on which are removably mounted upper caul plates 105. The jibs 104 on each platen act as stops to engage the next lower platen so that the extent of consolidation can be controlled by replaceable jibs of varying thickness. The surfaces of the caul plates are thus held parallel so that the product might have smooth, parallel surfaces.

The platens are hollow from side to side and one or several of the platens at the bottom of the stack of platens in the press are heated by means of hot air or hot gases blown through the interior thereof from tuyeres 106. The temperature of the air or hot gases is such that the material is heated throughout above the boiling point of water but below the charring point of paper, for example about three hundred degrees Fahrenheit. A range of two hundred seventy-five to three hundred ten degrees Fahrenheit will give good results. Heat is maintained sufficiently to transform the moisture in the wood and in the blankets to steam which escapes through the interstices between the veneer flakes. After several minutes of such moist heat the veneer flakes are softened sufficiently that the fibers of the veneer flakes will slip with respect to each other under pressure, thus permitting the mass to settle to the desired thickness. A sufficient number of platens are provided in the stack and means are employed in the press as set forth in the aboveidentified application so to cause the pressure on the lowermost layer of material to be in the order of thirty to forty pounds per square inch, which will compress the material under the conditions given above to the desired thickness and density. The stack is intermittently elevated and succeeding packs of material on platens and caul plates are introduced at the bottom. The platens are heated sufficiently to drive out all but one or two percent of the water, and permit the fibers to set in their compacted condition and the adhesive to harden in the press to form a solidified product which will maintain its form. Platens supporting finished boards are removed from the top of the stack, lowered to a point near the bottom where the finished boards and caul plates are removed, and the still hot platens returned to the bottom of the stack with new caul plates and material thereon. The boards are lifted from the caul plates which are then returned to the forming bin.

The fiber blankets on the outside of the board are likewise compressed and consolidated. The paper skins thus formed are smooth on their outer surfaces and irregular in thickness, conforming to the irregular surfaces of the core on their inner surfaces whereby firm adherence of the fiber skins is assured throughout the board. The fibers of the interior surfaces of the wet blankets are pushed down into the interstices between the core particles and consolidated in close adherence to the irregular surface of the core, thus interlocking the fiber skins with the core. The fiber skins will be denser and thinner above high spots in the core surfaces than in other places, resulting in the formation of light and dark mottled effects on the surfaces of the board. This effect becomes pronounced when the board is tempered by applying a siccative oil such as tung oil, linseed oil or synthetic substitutes therefor to impregnate the fiber skins. The less dense portions of the fiber skins show up as light areas indicated at 107 (Fig. 1) and the more dense portions as dark areas indicated at 108, even the hard growth rings of the wood showing through as dark streaks. From five to fifteen percent by weight of oil compared to the weight of dry fibers of the paper skins is applied.

It will be seen from the arrangement of the rolls of blanket material in the forming machine illustrated in Fig. 8 that the wire sides of the blankets of cellulosic fiber form the outer surfaces of the finished product. This is done purposely because the outer surface of the blanket as formed on a suction cylinder is irregular and wrinkled, and this irregular surface faces inwardly and is hidden within the finished product. The wire surface of the blanket is essentially smooth and the small wire markings thereon are ironed out under the pressure and steaming effected in the press, thus providing absolutely smooth exterior surfaces for the finished product.

While the blankets of cellulosic material may be of any reasonable thickness, it is preferred that the blankets be approximately one-eighth of an inch in thickness. Such blankets, when compressed and hardened to durable skins, have the desired properties. Thin blankets, such as in the order of one-sixteenth of an inch, permit more of the decorative effect to show through, and thicker blankets, such as three-sixteenths of an inch thick, while showing the decorative effect to a lesser extent, may be more desirable in providing greater resistance to bending of the finished product.

The core of the board, due to the readjustment of the fibrous structure of the veneer flakes, is uniform, has no voids, and is very strong. The random interleaving of a large number of thin veneer flakes formed as specified results in a product free of voids which is just as resistant to cracking, bending or splitting in any direction as it is in any other, which is highly resistant to compression, and is highly resistant to warping, swelling or shrinking because there is no regular fiber orientation. Furthermore, the nature of the process is such that a sort of annealing takes place, the fibers first slipping to permit compaction, then being reset in their new arrangements and annealed in the press so that there are no internal stresses in the product.

Having illustrated and described the product and the process of forming the same, it is to be appreciated that variations thereof will readily occur to those skilled in the art. I claim all such modifications as come within the true spirit and scope of the appended claims as being my invention.

I claim:

1. The method of manufacturing a composite board product which comprises forming straight grained veneer flakes ranging up to several inches in length and ranging up to several inches in width, said veneer flakes having a moisture content of forty to fifty percent, coating said veneer flakes with an adhesive, forming a pair of continuous loosely felted blankets from a thin slurry of cellulosic fibers in water, said blankets having a thickness of about one-sixteenth to one-eighth inch, forming a sandwich of a layer several inches in thickness of the coated veneer flakes interleaved in random orientation between two of said blankets while they are still wet and spongy from the water of said slurry, severing said sandwich into sections and compacting said sandwich sections into a product of boardlike density and uniform thickness under heat and pressure.

2. The method of manufacturing a composite board product comprising slicing blocks of moist wood parallel with the grain of the wood into a plurality of thin veneer flakes about twenty thousandths of an inch thick, several inches long and ranging up to several inches in width, coating said veneer flakes with an adhesive, forming a pair of continuous loosely felted wet blankets from a thin slurry of cellulosic fibers in water, reducing by suction the free water content of the blankets, said blankets having a thickness of about one-sixteenth to approximately one-eighth inch, forming a sandwich of a thick interleaved layer of the coated veneer flakes between two of said blankets while they are still spongy and wet with the water from said slurry, severing said sandwich into sections and compacting said sandwich sections into a product of boardlike density and uniform thickness under heat and pressure.

3. The method of making a composite board product comprising forming moist, straight grain veneer flakes several inches long, ranging up to several inches wide, and approximately twenty-thousandths of an inch in thickness, coating said veneer flakes with an adhesive protein powder, forming a pair of continuous loosely felted blankets from a thin slurry of cellulosic fibers in water, reducing by suction the free water content thereof without appreciable compression of the blankets whereby the blankets are still wet and spongy, forming a core layer several inches in thickness of the coated veneer flakes interleaved in random orientation of grain direction between two of said blankets while they are still spongy and wet with the water from said slurry, severing said sandwich into sections and compacting said sandwich sections into a product of boardlike density and uniform thickness under heat and pressure, the heat being about 300° F. and being applied to an extent sufficient to soften the veneer flakes, and said pressure being maintained on such sandwich sections until the veneer flakes are dried and the fibers thereof set in compacted condition.

4. The method of making a composite board product comprising slicing moist wood parallel with the grain into a plurality of thin veneer flakes several inches long and ranging up to several inches in width, dusting said veneer flakes with soya bean powder, forming a pair of continuous blankets from a thin slurry of cellulosic fibers in water, reducing by suction the free water content of said blankets without appreciable compression thereof whereby said blankets are still wet and spongy, smoothly laying down one of said blankets while still spongy and wet with the water from said slurry, piling upon said one blanket said dusted veneer flakes in random orientation of grain direction to a depth of several inches, smoothly spreading a second blanket while still spongy and wet with the water from said slurry over said veneer flakes to form a sandwich, severing said sandwich into sections, applying pressure to said sandwich sections uniformly while heating the same to above the boiling point of water but below the charring point of paper for a sufficient length of time to soften the veneer flakes and effect compression of the sandwich sections into a compact layer of boardlike density, and maintaining compression thereof while the adhesive and fibers set to form a stable product.

5. The method of manufacturing a composite board product which comprises coating with an adhesive thin wood pieces having a thickness of about twenty thousandths of an inch, ranging up to several inches in length and ranging up to several inches in width, said wood pieces having a moisture content of forty to fifty percent, forming a pair of continuous loosely felted blankets from a thin slurry of cellulosic fibers in water, said blankets having a thickness of about one-sixteenth to one-eighth inch, forming a sandwich of a layer several inches in thickness of the coated wood pieces interleaved in random orientation between two of said blankets while they are still wet and spongy from the water of said slurry, severing said sandwiches into sections and compacting said sandwich sections into a product of boardlike density and uniform thickness under heat and pressure.

References Cited in the file of this patent

UNITED STATES PATENTS

| | | |
|---|---|---|
| 291,164 | Dickman et al. | Jan. 1, 1884 |
| 1,125,445 | Beadle | Jan. 19, 1915 |
| 1,154,138 | Staley et al. | Sept. 21, 1915 |
| 1,732,398 | Daniels et al. | Oct. 22, 1929 |
| 2,075,317 | Upson | Mar. 30, 1937 |
| 2,398,632 | Frost et al. | Apr. 16, 1946 |
| 2,642,371 | Fahrni | June 16, 1953 |
| 2,649,034 | Gramelspacher | Aug. 18, 1953 |
| 2,658,847 | MacDonald | Nov. 10, 1953 |
| 2,686,143 | Fahrni | Aug. 10, 1954 |
| 2,693,619 | Goss | Nov. 9, 1954 |
| 2,701,930 | Dolan | Feb. 15, 1955 |
| 2,710,276 | Mottet et al. | June 7, 1955 |
| 2,745,779 | Ritter et al. | May 15, 1956 |
| 2,751,947 | Wyss | June 29, 1956 |
| 2,757,583 | Basler | Aug. 7, 1956 |
| 2,761,487 | Ware | Sept. 4, 1956 |
| 2,786,005 | Clark | Mar. 19, 1957 |
| 2,817,617 | Rogers | Dec. 24, 1957 |
| 2,826,521 | Robinson | Mar. 11, 1958 |
| 2,830,004 | Lyons | Apr. 8, 1958 |

FOREIGN PATENTS

| | | |
|---|---|---|
| 120,157 | Great Britain | Oct. 31, 1918 |
| 190,058 | Great Britain | Dec. 14, 1922 |
| 452,207 | Great Britain | Aug. 17, 1936 |
| 644,564 | Great Britain | Oct. 11, 1950 |